(12) United States Patent
Pintar et al.

(10) Patent No.: US 8,108,828 B2
(45) Date of Patent: Jan. 31, 2012

(54) SYSTEM FOR GENERATING OPTIMIZED COMPUTER DATA FIELD CONVERSION ROUTINES

(75) Inventors: Kevin M. Pintar, Round Rock, TX (US); Donald L. Bolen, Phoenix, AZ (US)

(73) Assignee: Computer Associates Think, Inc., Islandia, NY (US)

( * ) Notice: Subject to any disclaimer, the term of this patent is extended or adjusted under 35 U.S.C. 154(b) by 959 days.

(21) Appl. No.: 12/104,076

(22) Filed: Apr. 16, 2008

(65) Prior Publication Data

US 2008/0216099 A1    Sep. 4, 2008

Related U.S. Application Data

(63) Continuation of application No. 09/273,149, filed on Mar. 19, 1999, now abandoned.

(51) Int. Cl.
*G06F 9/44* (2006.01)
(52) U.S. Cl. ......... 717/106; 717/111; 707/602; 707/756
(58) Field of Classification Search .................. 717/106, 717/111; 707/602, 756
See application file for complete search history.

(56) References Cited

U.S. PATENT DOCUMENTS

| | | | | |
|---|---|---|---|---|
| 5,907,709 A | | 5/1999 | Cantey et al. ................. | 395/705 |
| 6,085,203 A | * | 7/2000 | Ahlers et al. .................. | 715/201 |
| 6,502,236 B1 | * | 12/2002 | Allen et al. .................... | 717/136 |
| 6,772,413 B2 | | 8/2004 | Kuznetsov .................... | 717/136 |
| 7,747,594 B2 | * | 6/2010 | Probert et al. ................. | 707/705 |

OTHER PUBLICATIONS

Automated Code Checker, IBM TDB, vol. 35. No. 9B, pp. 239-240, Sep. 1993.
Lemay et al., "Laura Lemay's Web Workshop ActiveX and VBScript," Sams, pp. 69-75, 116-123, Dec. 1996.

* cited by examiner

*Primary Examiner* — Andy Ho
(74) *Attorney, Agent, or Firm* — Baker Botts L.L.P.

(57) ABSTRACT

A system converts data from input field types to output field types. The system receives a plurality of input attributes and output attributes from an application program, dynamically generates a plurality of data field conversion routines for each set of input attributes and output attributes, and stores the plurality of data field conversion routines in memory that is accessible to the application program.

27 Claims, 14 Drawing Sheets

```
R5  = Current Instruction Offset within application buffer
R6  = Current Instruction Address within application buffer
R7  = Work Register - used for calculating offsets, etc
R12 = Base register of code generator and template code SLR    R5, R5              clear offset
L      R6, $BCB_BCODE_@    get address of user buffer

* if linkage required call standard linkage builder
IF (TM, $BCB_PFLAG1, $BCB_LINKAGE, O)
   SETF        LINKAGE
   IF (CLI, $BCB_LINKAGE, TYPE, EQ, C'N')
      RESETF   LINKAGE
   COND ELSE
* call standard linkage builder
      #BAS     14, =A (BURST_ENTRY_LINKAGE)
   ENDIF
ELSE
   RESETF      LINKAGE
ENDIF
****
STDRETURN       -      RETURN TO APPLICATION
* $BCB_BCODE_@ WILL POINT TO BUILT CODE
****
*
* Routine to build standard entry linkage
*
BURST_ENTRY_LINKAGE CSMSUBI BASE=R10, WORKREG=R3
*
* Move Template code into user buffer
       MVC  0 (STD_ENTL_010_L, R6), STD_ENTL_010
*
* Modify "    LA    R14,0(0)" instruction
* Get Offset to Savearea using equate STD_ENTL_010_SA_A
* Set base register for instruction to R12
* Set D (X,B) of instruction (R7 contains constructed D (X,B) )
       LA   R7, STD_ENTL_010_SA_A (,R5)
       O    R7, =X'0000C000'
       STH  R7, STD_ENTL_010_SA_T (,R6)
*
```

*FIG. 5a*

```
* Modify     " B        0 (R12)" instruction
* Get offset of branch target using equate STD_ENTL_010_B_A_T
* Set D (X,B) of instruction (R7 contains constructed D (X,B) )
* ** Note X ( index register ) has been set by assembler as R12
*    STH does not change the instruction's index register
         LA    R7, STD_ENTL_010_B_A_T (,R5) CALC OFFSET FOR BRANCH TARGET
         STH   R7, STD_ENTL_010_B_A_ (,R6)   SET BRANCH D ( X,B )
*
* Increment Next Instruction Offset  (in R5) by length of code
* Increment Next Instruction Address (in R6) by length of code
         LA    R5, STD_ENTL_010_L (,R5)
         LA    R6, STD_ENTL_010_L (,R6)
*
* Return to caller
* Code has been built and the Instruction Offset and Address registers
* have been updated for next instruction construction
         CSMSUB0
*- STANDARD ENTRY LINKAGE -----------------------------------------
*
*-----------------------------------------------------------------
STD_ENTL_010 DS  0S
         STM   R14, R12, 12 (R13)
STD_ENTL_010 _SA_T EQU *-STD_ENTL_010+2
         LA    R14, 0 (0)                BURSTED SAVEAREA+0
         ST    R13, 4 (, R14)
         ST    R14, 8 (, R13)
         LR    R13, R14                  R13 = BURSTED SAVEAREA
         LR    R12, R15                  SET BURSTED BASE REG
STD_ENTL_010 _B_A EQU *-STD_ENTL_010+2
         B     0 (R12)                   WS_BRANCH
STD_ENTL_010 _SA_A EQU *-STD_ENTL_010
         DC    18F'0'
STD_ENTL_010 _B_A_T EQU *-STD_ENTL_010
STD_ENTL_010 _L    EQU *-STD_ENTL_010
*-----------------------------------------------------------------
```

*FIG. 5b*

* Call made by API passing API $BURSTCB control block
* Control block contains field attributes and conversion
* options

* Reset processing flags
* NO_BUILD -> doing conversion routine storage calculation
* CALLED_ROUTINE -> creating a called routine
* Check for API block -> if not there abend with dump
* Copy passed API block to working storage (IN_BCB)

```
MAIN_0000  DS      0S
*
           RESETF  NO_BUILD
           RESETF  CALLED_ROUTINE
*
           LTR     R1, R1
           BNZ     MAIN_0005
*
           ABEND   001, DUMP
*
MAIN_0005  DS      0S
           MVC     IN_BCB ($BCB_LENGTH), 0 (R1)
*
           LA      R9, IN_BCB           R9 = ADDRESS OF $BURSTCB
           USING   $BURSTCB, R9
*
```

* If calculate storage requested SET NO_BUILD
        IF (CLC, $BCB_FUNC, EQ, =Y ($BCB_CALC_STORAGE) )
           SETF   NO_BUILD
        ENDIF

* INITIALIZE WORKING STORAGE
*  If actually BUILDING code (not NO_BUILD)
*   1. Obtain offset from beginning of BASE REGISTER
*     for code. If callable routine this has been set to 0.
*     otherwise this we are building inline code within the application's
*     user managed buffer and the offset will set to current instruction offset
*     within the buffer.
*   2. Obtain address of passed code buffer
*   3. Calculate current instruction address based on offset into buffer

*FIG. 6a*

```
MAIN_STRT DS     0S
          IF (-NO_BUILD)
          LH       R5, $BCB_BCODE_OFFSET
          L        R6, $BCB_BCODE_@
          LA       R6, 0 (R5, R6)
       ELSE
          SLR      R5, R5                          CLEAR FOR ACCUM
          SLR      R6, R6                          CLEAR FOR ACCUM
       ENDIF
*
*  INITIALIZE WORK FIELDS FOR ANY COLUMN CONVERSION
*  1. Obtain input field's addressing register
*  2. Build RX type assembler instruction D (X,B) with offset 0
*  3. Obtain output field's addressing register
*  4. Build RX type assembler instruction D (X,B) with offset 0
*     set template for output D (X,B)
*  5. Obtain input and output lengths
*  6. Set Current working D (X,B) templates
          SLR      R7, R7
          ICM      R7, B'0001', $BCB_IREG
          SLL      R7, 4                           SHIFT NIBBLE
          STC      R7, WB_INIT_SOURCE_DB
          ICM      R7, B'0001', $BCB_OREG
          SLL      R7, 4                           SHIFT NIBBLE
          STC      R7, WB_INIT_TARGET_DB
          MVC      WB_TOT_INPUT_LEN_$BCB_ILEN
          MVC      WB_TOT_OUTPUT_LEN_$BCB_OLEN
          MVC      WB_SOURCE_DB, WB_INIT_SOURCE_DB  RESET DB
          MVC      WB_TARGET_DB, WB_INIT_TARGET_DB  RESET DB
*
*    CHECK FOR LINKAGE REQUIREMENTS
*    IF LINKAGE = E (BASIC ENTRY - SAVE/ RESTORE R14) THEN
*       BURST_WORK_BRANCH WILL SAVE R14 AND SET RESTORE_R14
*       BURST_EXIT_LINKAGE RESTORES R14 AND BASR R14
*    ENDIF
                   RESETF RESTORE_R14
                   IF (TM, $BCB_PFLAG1, $BCB_LINKAGE, 0)
                      SETF    LINKAGE
                      IF (CLI, $BCB_LINKAGE_TYPE, EQ, C'N')
                        RESETF    LINKAGE
                      COND ELSE
                        #BAS   14,=A (BURST_ENTRY_LINKAGE)
                        ENDIF
                   ELSE
                      RESETF    LINKAGE
                   ENDIF
```

FIG. 6b

```
*  CALL INPUT TYPE PROCESSING ROUTINE
*  1. Get address of input field type table
*     This table contains an index of supported input types
*     with their associated code generation routines
*  2. Call code generation routine for Input field type
*     In this case INPUT FIELD TYPE IS CHARACTER
*     INPUT FIELD TYPE CHARACTER calls routine named CHARACTER
**** Further down subroutine CHARACTER is shown
          L     R14,=A (TYPE_TABLE)
          LH    R15, $BCB_ITYPE
          LA    R15, 0 (R14, R15)
          L     R15, 0 (,R15)
          BASR  R14, R15
*  Subroutine has built conversion code for INPUT TYPE CHARACTER and OUTPUT TYPE CHARACTER
*  Check for other process options such as: accumulate a source addressing register,
*  accumulate a target addressing register, or accumulate alternate register.
*  alternate register usually is a total output length accumulator used by the calling
*  application to keep track of an aggregate of all output field lengths
*  1. IF source addressing register accumulate requested build code to accumulate
*  2. IF target addressing register accumulate requested build code to accumulate
*  3. IF length register accumulate requested build code to accumulate
*  4. IF exit linkage requested build exit linkage
*  5. RETURN TO API CALLER with generated conversion routine
MAIN_0200 DS    0S
          IF (TM, $BCB_PFLAG1, $BCB_SRC_ACUM, 0)
              LH    R0, WB_SOURCE_ACCUM_INDEX
              IC    R1, $BCB_SRC_ACUM_REG
              LH    R7, WB_TOT_INPUT_LEN
              #BAS  14, =A (FIXED_ACCUM)
          ENDIF
*
          IF (TM, $BCB_PFLAG1, $BCB_TRG_ACUM, 0)
              LH    R0, WB_TARGET_ACCUM_INDEX
              IC    R1, $BCB_TRG_ACUM_REG
              LH    R7, WB_TOT_OUTPUT_LEN
              #BAS  14, =A (FIXED_ACCUM)
          ENDIF
*
          IF (TM, $BCB_PFLAG1, $BCB_TRG_L_ACUM, 0)
              LH    R0, WB_TARGET_ACCUM_INDEX
              IC    R1, $BCB_TLN_ACUM_REG
              LH    R7, WB_TOT_OUTPUT_LEN
              #BAS  14, =A (FIXED_ACCUM)
          ENDIF
*
*  BURST EXIT LINKAGE
          IF (LINKAGE)
              SETF  CLEAR_R15
              #BAS  14, =A (BURST_EXIT_LINKAGE)
          ENDIF
          RETURN to CALLER
```

```
*-------------------------------------------------------------*
*                                                             *
*  Character Input Field Type Conversion Routine              *
*  Abstract:                                                  *
*     This routine is called to either build Character Input  *
*     Fields to all supported Output Field Types, or to calculate *
*     storage requirements for generated conversion routines for *
*     Input field type Character                              *
*                                                             *
*  CHARACTER field type constraints                           *
*     These field types will be of fixed length               *
*     Maximum length is 254 8bit bytes                        *
*     They may be proceeded with a null field indicator of length *
*        1 byte that will contain values of x'00' for non-null fields *
*        and x'ff' for nulled fields. Nulled fields will not be *
*        converted accept to indicate on output that field was null *
*     There values are of EBCDIC CCSID  (character code set) unless *
*     a CCSID is specified through the API.                   *
*                                                             *
*-------------------------------------------------------------*

CHARACTER CSMSUBI BASE=R10, WORKREG=R3
*    Use branch table generated by API to branch on output type (BTYPE=0)
*    Example is demonstrating character to character conversion
*    Branch will be taken to CHAR_CHAR_0000
         L        R15, =A (RC_32)
         $BURST   BTABLE                              X
                  BREG=1,                             X
                  BTYPE=0,                            X
                  UNSUPPORTED=0 (,R15),               X
                  CHAR=CHAR_CHAR_0000,                X
                  LVARC=CHAR_VARC_0000,               X
                  VARC=CHAR_VARC_0000

*-@PSEUDO-CODE@------------------------------------------
*                 CHARACTER TO CHARACTER CONVERSION
*
*  - DETERMINE WORKING STORAGE
*     Some conversions require the generation of local working storage
*     Working storage is generated according to specific conversion options and
*     specific input and output field attributes to avoid generating more storage
*     than needed
*
*     IF CONVERTING CCSID'S (Character code sets) THEN
*        IF using a character translation table (uses TR instruction)
*           Build BRANCH over working storage
*           Build FULL WORD to hold Address character translation table
*           UPDATE Previously built Branch instruction to branch to current offset
*              (offset is next halfword aligned byte where next instruction is to be built)
*        ENDIF
*     ENDIF
*
```

*FIG. 6e*

```
*   IF INPUT LENGTH is GREATER than OUTPUT LENGTH
*       current implementation allows for truncation of trailing spaces
*       If input field being converted by generated code contains non-spaces
*          that won't fit into output field of lesser length then conversion
*          error 4 routine will be called to return a value of 4 in R15
*
*   1. Build BRANCH over working storage
*   2. Build a buffer full of spaces to be used in INPUT field compare
*   3. Build Conversion error routine to return error #4
*   4. UPDATE Previously built Branch instruction to branch to current offset
*        (offset is next halfword aligned byte where next instruction is to be built)
*   ENDIF
* - DETERMINE WORKING STORAGE
*
*-@PSEUDO-CODE@---------------------------CHAR_CHAR_0000 DS 0S
*
*   BURST WORKAREA IF CONVERSION ERROR OR CONVERT CCSID
          TM      $BCB_PFLAG2, $BCB_CCSID_CNV
          BNZ     CHAR_CHAR_0020
          CLC     $BCB_ILEN, $BCB_OLEN
          BNH     CHAR_CHAR_0040
*
CHAR_CHAR_0020 DS 0S
          #BAS    14, =A (BURST_WORK_BRANCH)
*
          IF (TM, $BCB_PFLAG2, $BCB_CCSID_CNV, NZ)
            IF (TM, $BCB_PFLAG2, $BCB_CCSID_CNV_ATOE, 0)
              #BAS    14, =A(BURST_BWK_TO_E_XLATE_@)
            ELSE
              #BAS    14, =A(BURST_BWK_TO_O_XLATE_@)
            ENDIF
            #BAS    14, =A(BURST_BWK_FULL)
            STH     R7, WB_SAVE_R2_OFFSET
          ENDIF
*
*   IF ILEN > OLEN THEN NEED FOLLOWING WORK FIELDS
*      BURST BUFFER255 - SPACES
*      BURST #@ERROR4 CALL
*   ENDIF
          IF (CLC, $BCB_ILEN, GT, $BCB_OLEN)
            #BAS    14, =A(BURST_BWK_BUFFER255)
*
*
            LA      R1, 4                            #@ERROR4
            #BAS    14, =A (BUILD_CNVERR)
          ENDIF
*
          #BAS    14, =A (UPDATE_WORK_BRANCH)
*
*
```

```
*   IF OUTPUT NULLABLE THEN
*     BURST MOVEMENT OF NUL INDICATOR
*     R1 = X'00' FOR MVI Instruction Builder
*     WB_TARGET_DB (current target D(B) ) USED FOR INDICATOR LOCATION
*     Build MVI OF NULL INDICATOR (MVI_0000)
*     UPDATE Current TARGET D (B) TO ALLOW DATA TO SKIP NULL INDICATOR
*     ADD 1 TO TOT OUTPUT LENGTH (FOR NULL INDC)  (this allows for accumulation requests)
*   ENDIF
CHAR_CHAR_0040 DS 0S
          IF  (TM, $BCB_OFLAG1, $BCB_ONULL, 0)
          SLR     R1, R1                          CLEAR SOURCE BYTE
          #BAS    14, =A (MVI_0000)               BURST MVI NULL INDC
*
          LH      R1, WB_TARGET_DB                UPDATE TARGET DB
          LA      R1, 1 (, R1)
          STH     R1, WB_TARGET_DB
*
          LH      R1, WB_TOT_OUTPUT_LEN           UPDATE OUTPUT LEN
          LA      R1, 1 (, R1)
          STH     R1, WB_TOT_OUTPUT_LEN
          ENDIF
*
*   IF input length < then output length
*     call routine to build code to pad output field with spaces
*   ELSE
*     IF input length = Output length
*       Call routine to build an MVC instruction
*          This routine uses current source and target D (B) 's
*             and the output length to construct the instruction
*     ELSE
*       input length > output length
*       Call routine to build an MVC instruction
*          This routine call will use the input length (since it shorter)
*          (source and target D (B)'s will be used
*       Build Code to check for truncation of only spaces
*     ENDIF
*   ENDIF
          LH      R1, $BCB_ILEN                   GET INPUT LEN
          LH      R2, $BCB_OLEN                   GET OUTPUT LEN
*
          CR      R1, R2                          CHECK LENGTHS
          BE      CHAR_CHAR_0050                     EQUAL
          BH      CHAR_CHAR_0100                     I > O ->
*
*   INPUT LENGTH LESS THAN OUTPUT -> NEED TO PAD
*   Build Character padding code
          #BAS    14, =A (SSP_0000)
*
*   Build code TO MOVE CHARACTER FIELD TO CHARACTER FIELD
CHAR_CHAR_0050 DS    0S
          #BAS    14, =A (MVC_0000)               BURST MVC INSTRUCTION
          B       CHAR_CHAR_0200
```

FIG. 6f

```
* INPUT field is too large to fit
* Build code TO MOVE CHARACTER FIELD TO CHARACTER FIELD using input field's length
CHAR_CHAR_0100 DS    0S
          LR     R1, R2
          #BAS   14,=A(MVC_00000)              BURST MVC INSTRUCTION
*
* MOVE CHECK FOR SPACES
* IF TRUNCATED DATA NOT SPACES THEN #@ERROR4

IF  (-NO_BUILD)
*
          MVC    0(CHAR_CHAR_010_L, R6), CHAR_CHAR_010
*
* SET LENGTH OF COMPARE
          LH     R7, $BCB_ILEN
          SR     R7, R1
          BCTR   R7, 0
          STC    R7, CHAR_CHAR_010_OLEN_A (,R6)
*
* SET SOURCE DB TO SOURCE + OLEN-1
          LH     R7, WB_SOURCE_DB
          LA     R7, 0 (R1, R7)
          BCTR   R7, 0
          STH    R7, CHAR_CHAR_010_SDBN_A (,R6)
*
* UPDATE BUFFER OFFSET
          LH     R7, WB_BUFFER255_OFFSET
          O      R7, =X'0000C000'
          STH    R7, CHAR_CHAR_010_B255_A (,R6)
*
* UPDATE #@ERROR4 BRANCH
          LH     R7, WB_CNVERR4_OFFSET
          STH    R7, CHAR_CHAR_010_BERR_A (,R6)
*
          ENDIF                   (NO_BUILD)
*
          LA     R5, CHAR_CHAR_010_L (,R5)
          LA     R6, CHAR_CHAR_010_L (,R6)
*
```

*FIG. 6g*

```
*  CHECK FOR TRANSLATION of CCSID's
*  If translation requested call translation routine generator
*    *** note translation routine will perform accumulation
*        operation if API requested it. If accumulation is performed
*        by the routine the IN_BCB (copy of API block used by generator)
*        will be updated to turn off accumulation by the main process
*        done upon CHARACTER subroutine (see above)
CHAR_CHAR_0200 DS    0S
               IF (TM, $BCB_PFLAG2, $BCB_CCSID_CNV, NZ)
*                  IF IREG =2 AND SRC_ACCUM TR INST WILL BUMP REG
                   SETF   SAVE_R2
                   IF (CLC, $BCB_IREG, EQ, =H'2'), AND,                            X
                   (TM, $BCB_PFLAG1, $BCB_TRG_ACUM+$BCB_TRG_L_ACUM, NZ)
                      RESETF SAVE_R2
                      NI         $BCB_PFLAG1, X'FF'-$BCB_SRC_ACUM
                   ENDIF
                   RESETF XLATE_TO_E
                   IF (TM, $BCB_PFLAG2, $BCB_CCSID_CNV_ATOE, 0)
                      SETF XLATE_TO_E
                   ENDIF
                   #BAS    14, =A (DO_XTAB_SHORT)
               ENDIF
*
CHAR_9999 DS    0S
          B     CHARACTER_END
*------------------------------------------------------------------------|
*  BURST CHARACTER TO CHARACTER ILEN > OLEN
*  TEMPLATE CODE USED FOR NON-SPACE TRUNCATION                           |
*------------------------------------------------------------------------|
CHAR_CHAR_010 DS 0S                                                      |
CHAR_CHAR_010_OLEN_A EQU *-CHAR_CHAR_010+1    LEN OF CLC                 |
CHAR_CHAR_010_SDBN_A EQU *-CHAR_CHAR_010+2    LOC OF SOURCE TO COMP      |
CHAR_CHAR_010_B255_A EQU *-CHAR_CHAR_010+4    LOC OF 255 SPACES          |
              CLC     0 (0, 0) , 0 (0)        SDB+ (OLEN-1), BWK_BUFF255 |
CHAR_CHAR_010_BERR_A EQU *-CHAR_CHAR_010+2
              BNE     0 (R12)                 NOT SPACES? -> #@ERROR4    |
CHAR_CHAR_010_L    EQU *-CHAR_CHAR_010                                   |
*------------------------------------------------------------------------|
```

*FIG. 6h*

SYSTEM FOR GENERATING OPTIMIZED COMPUTER DATA FIELD CONVERSION ROUTINES

RELATED APPLICATIONS

This application is a continuation of U.S. application Ser. No. 09/273,149 entitled System for Generating Optimized Computer Data Field Conversion Routines, filed Mar. 19, 1999, and abandoned Jun. 3, 2008.

FIELD OF THE INVENTION

The present invention is directed to computer data. More particularly, the present invention is directed to the conversion of one type of computer data field to another type.

BACKGROUND OF THE INVENTION

In many instances during computer processing of information, computer data must be converted from one data field type to another. For example, whenever data is passed from one program to another, the data typically goes though several conversions during the process, such as converting from text digits to a binary number.

The typical technique for converting data includes using a generic data conversion routine. When an entire record of data must be converted, the conversion routine must determine what the characteristics or attributes are for each of the data fields in the record. This may require the conversion routine to execute the same decision tree for each field for each record even though each field has known characteristics that do not change on a row by row basis. Therefore, many computer cycles are wasted by asking questions such as "Is this field of type character, integer, etc.?" over and over for each data field.

Based on the foregoing, there is a need for a system that provides efficient conversion of data fields.

SUMMARY OF THE INVENTION

One embodiment of the present invention is a system for converting data from input field types to output field types. The system receives a plurality of inlet attributes and output attributes from an application program, dynamically generates a plurality of data field conversion routines for each set of input attributes and output attributes, and stores the plurality of data field conversion routines in memory that is accessible to the application program.

BRIEF DESCRIPTION OF THE DRAWINGS

FIGS. 6a-6h illustrate a specific example of a dynamic code generation routine that performs CHARACTER to CHARACTER conversions.

DETAILED DESCRIPTION

Figure 1:
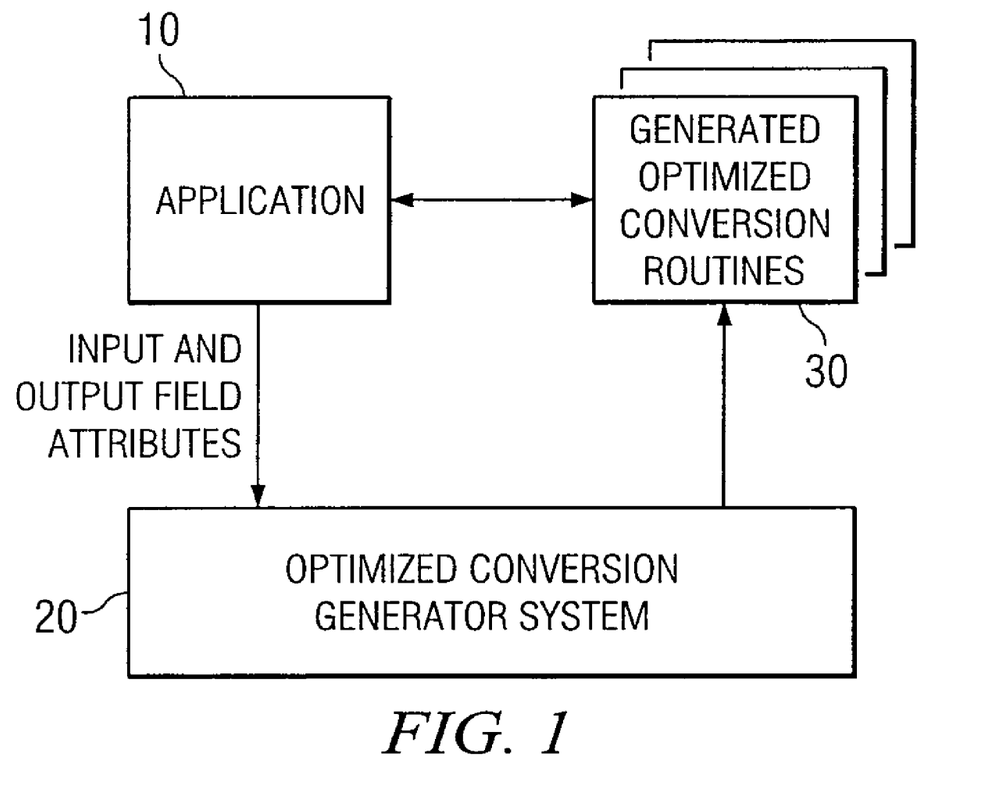
FIG. 1 is a block diagram that illustrates an overview of the functionality of an optimized conversion generator system in accordance with one embodiment of the present invention.

One embodiment of the present invention is a system that generates optimized data field to data field conversion routines for each type of conversion required by an application program. FIG. 1 is a block diagram that illustrates an overview of the functionality of an optimized conversion generator system 20 in accordance with one embodiment of the present invention. System 20 can be implemented in software and executed on a general purpose computer that includes a central processing unit, and memory. In one embodiment, system 20 is implemented with IBM/360 machine instructions.

An application program 10 requires one or more types of field conversions to be executed. For each type of conversion, application 10 provides to system 20 the input (or "source") and output (or "destination") field attributes. For each set of input and output field attributes, system 20 dynamically generates an optimized conversion routine 30 that performs the conversion. The optimized routines 30 are placed in storage that is available to application 10.

The routines 30 in one embodiment are generated as stand-alone routines that are capable of being serially reusable and are called by application 10 using, for example, an application program interface ("API") when a conversion is required. In another embodiment. the routines 30 are generated as code chunks that are inserted inline with application 10 and are directly accessed when a conversion is required.

One benefit of the present invention is that by building optimized conversion routines specifically tailored to the input and output field attributes, every execution of the routine saves numerous instructions that would normally be needed to identify field attributes each time the conversion is executed.

Figure 2:
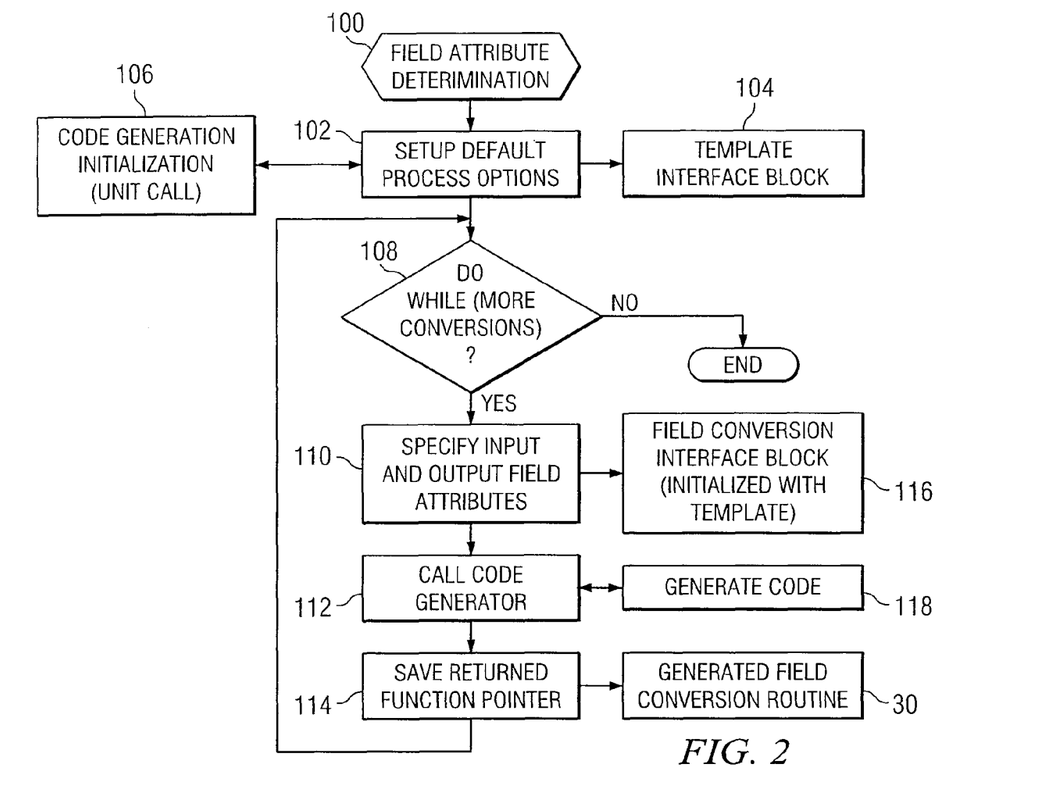
FIG. 2 is a flowchart of the steps performed by the system in accordance with one embodiment of the present invention to generate optimized conversion routines.

FIG. 2 is a flowchart of the steps performed by system 20 in accordance with one embodiment of the present invention to generate optimized conversion routines 30. The steps are executed by system 20 after application 10 determines at step 100 what attributes the input fields and output fields have.

At step 102, system 20 sets up the default process options of the generated conversion routines 30. The options may include whether the generated conversion routines 30 will be callable functions (i.e., able to be called by application 10), or copied inline into application 10. Step 102 builds a template interface block 104 which is an interface between application 10 and conversion generator system 20. Step 102 also generates an initiation call 106 that obtains the necessary storage and checks for errors.

At step 108, a loop is initiated. The loop continues until all fields that must be converted are exhausted.

Within the loop, at step 110 each set of input and output field attributes is received from application 10. The attributes are received through an API, and step 110 also builds a common field conversion interface block 116 based on the attributes.

At step 112, the code generator of system 20 is called, using the common interface block 116. Step 112 generates code 118.

At step 114, a function pointer that points to the generated field conversion routine 30 is saved.

Figure 3:
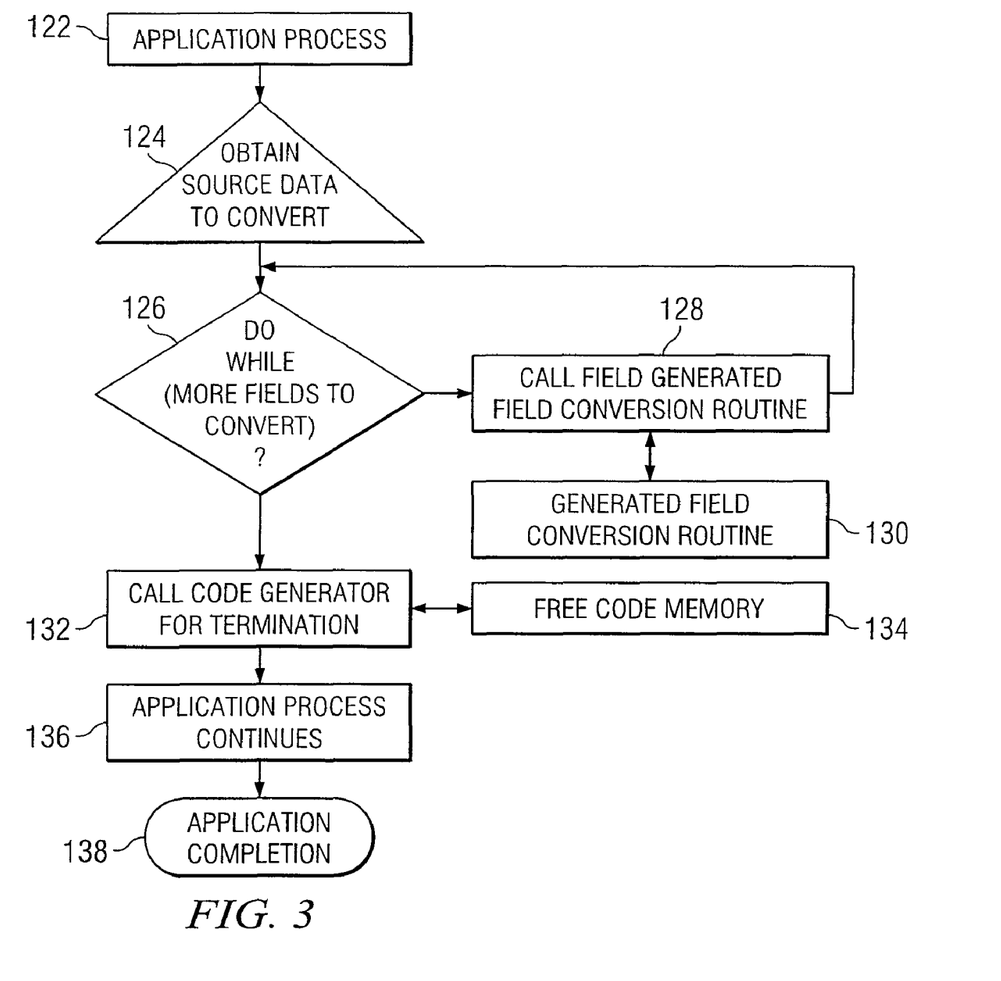
FIG. 3 is a flowchart of the steps executed by the application when using the routines to convert input fields to output fields.

FIG. 3 is a flowchart of the steps executed by application 10 when using routines 30 to convert input fields to output fields.

During step 122, the application is processing. At step 124, the application obtains source or input data to convert. Typically, step 124 involves reading one or more records.

At step 126, a loop is initiated for each record read. At step 128, in one embodiment the appropriate conversion routine 30 for the conversion is called.

When all the data field and records are converted, at step 132 the code generator system 20 is called for termination. This results in freeing up memory at step 134.

At step 136, application 10 continues to process. Finally, at step 138 application 10 is completed.

Figure 4A:
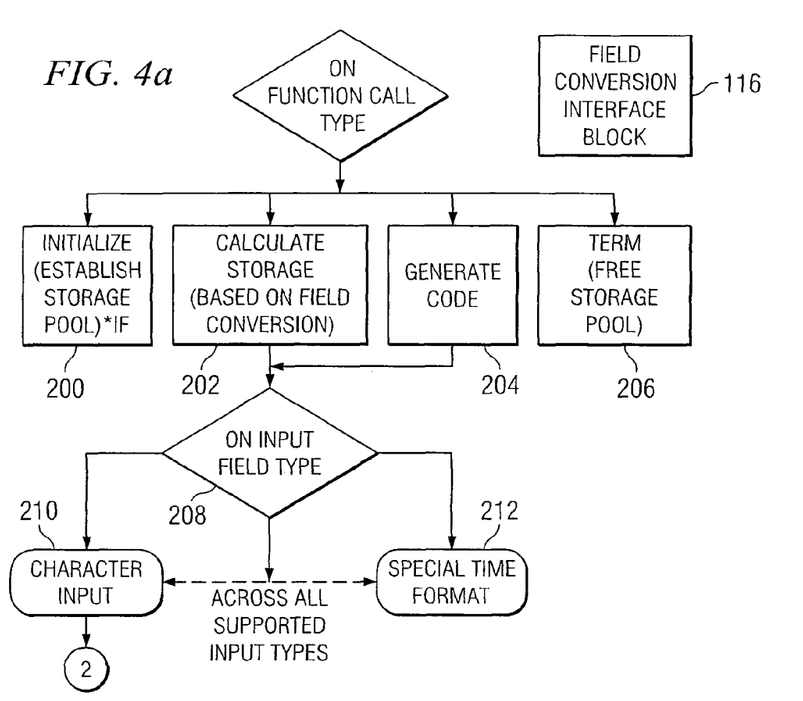
FIG. 4 is a flowchart of the code generating steps executed the conversion generator system to generate code when called by the application.
Figure 4B:
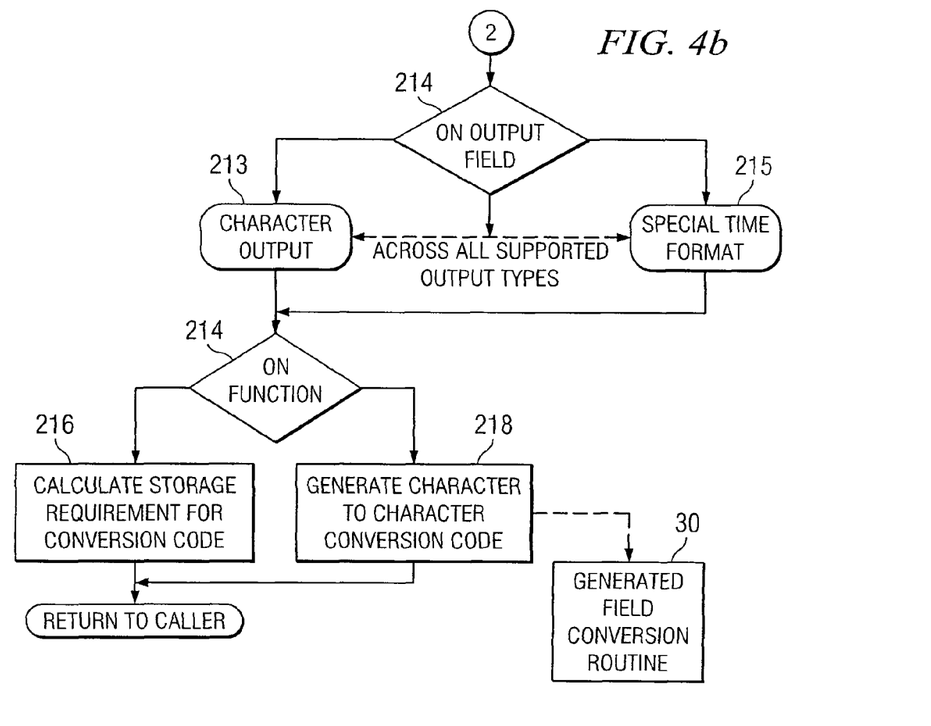

FIG. 4 is a flowchart of the code generating steps executed by conversion generator system 20 to generate code when called by application 10.

At step 200, system 20 initializes by, for example, establishing the required storage, checking for invalid options, and specifying how the code should be generated.

At step 202, system 20 validates specific field conversion options such as verifying that the input and output lengths are correct. Step 202 also determines how big the code will be when generated. This can be used by application 10 if the generated code will be stored inline.

At step 204, system 20 builds the conversion routine using field conversion interface block 116.

At step 206, the storage obtained at step 200 is released.

Steps 202 and 204 go through the same internal process. Therefore, at step 208 the input field type is determined. Examples of input field types include character input 210 or special time format input 212. However, any input field type is supported by the present invention.

Similarly, at step 214 the output field type is determined. Examples of output field types also include character input 213 or special time format input 215, but any output field type is supported by the present invention.

At step 216, if step 202 was executed, the size of the generated code is determined. At step 218, if step 204 was executed, the field conversion routines 30 are generated.

As disclosed, system 20 in accordance with one embodiment of the present invention dynamically generates optimized conversion routines 30 for each set of input and output field attributes. Routines 30 are then utilized by application 10 to process conversions. Input and output fields are categorized into archetypal data types by system 20, each with definable attributes and conversion behaviors. For example:

Character data types will be a fixed length field with a maximum length attribute and a CCSID (or character set code page) attribute.

Date data types will be a fixed length field with a maximum length attribute and a format attribute (ISO, EUR, etc.) which determines location and type of separators used in date.

Some previously described or additional features included in one embodiment of optimized conversion generator system 20 include:

Optionally obtain and free storage for API control blocks and/or generated code.

API control blocks can be chained and templated by API management functions.

API control blocks can be built through use of a macro interface.

Conversion routines can utilize registers to address the input and output field locations directly. The registers can be chosen by application 10 through API parameters.

The source field address register may optionally be incremented to the end of the input field after conversion based on API parameters.

The target field address register may optionally be incremented to the end of the formatted field after conversion based on API parameters.

An additional register may be incremented by the length of the converted field based on API parameters.

Standard Linkage may be generated for conversion routines based on API parameters.

Conversion Error exits may be specified to handle enumerated conversion error conditions based on API parameters.

Character Code Set translation conversion code can be generated based on API parameters (i.e., ASCII character fields can be translated to EBCDIC character fields).

Conversion routines can be generated to utilize the latest instructions supported by the level of the operating system for which the code is being generated.

In one embodiment, system 20 dynamically generates code by building code chunks in storage accessible by calling application 10 based on various settings in the API control block. Generating the code involves the following steps, as discussed in conjunction with the flowcharts:

1. Obtain storage for the code.
2. Identify code templates needed.
3. Move code templates.
4. Modify code templates.
5. Return executable code to calling application.

Further, in one embodiment system 20 can optionally, based on the API specification, generate program debugging instrumentation for the dynamically generated code. This instrumentation can include an optional dynamically allocated output file containing, for each field conversion: a report of the API options used for each dynamically generated routine that can be used to insure correctness of field attributes and general processing options; and a disassembled listing of the dynamically generated routine provided by an internal disassembler within system 20 that can be used to identify conversion code inaccuracies and areas of further optimization, and to help resolve generated code failures.

Figure 5A:
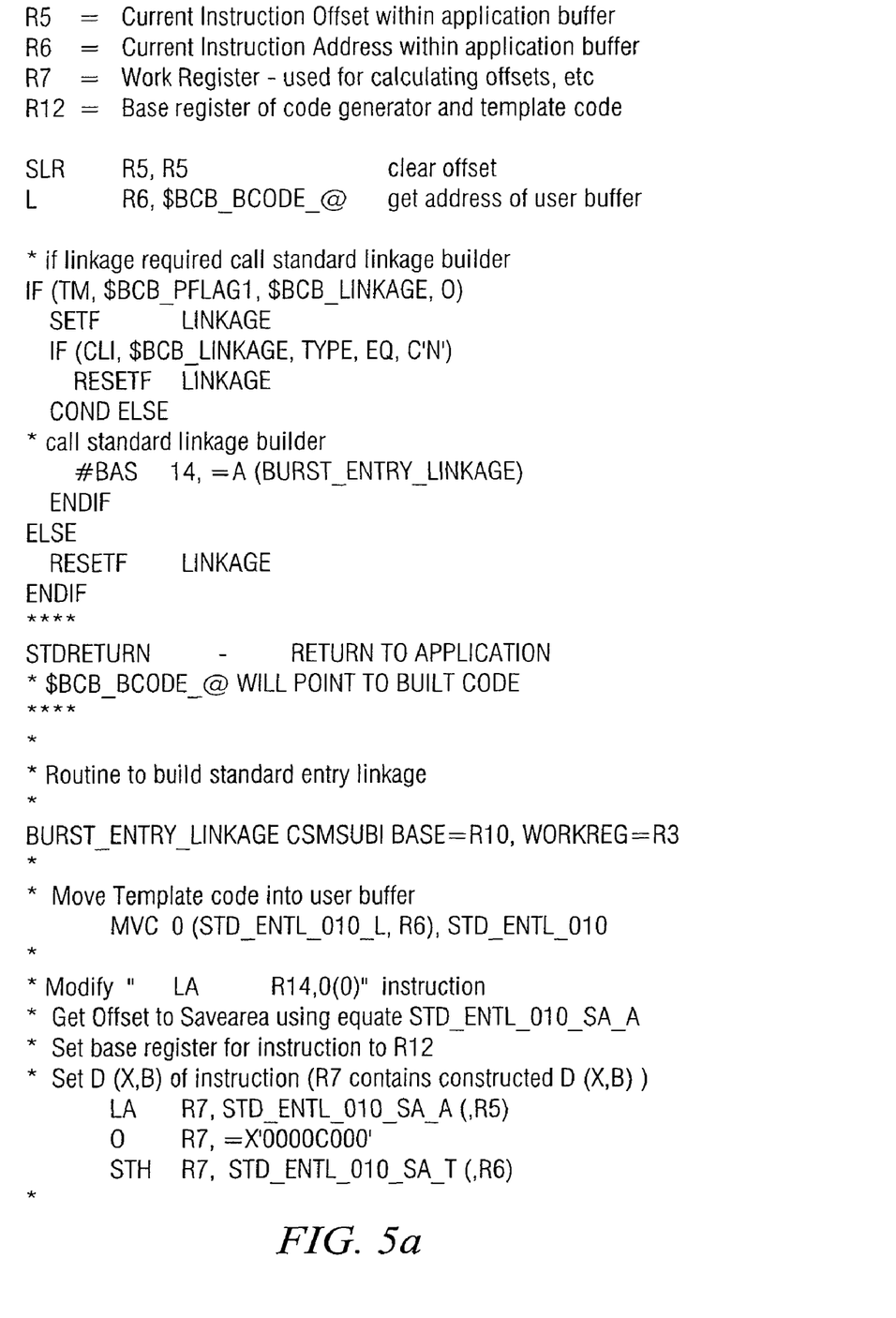
FIGS. 5a and 5b illustrate a general example of dynamic code building that is used in one embodiment of the present invention.
Figure 5B:
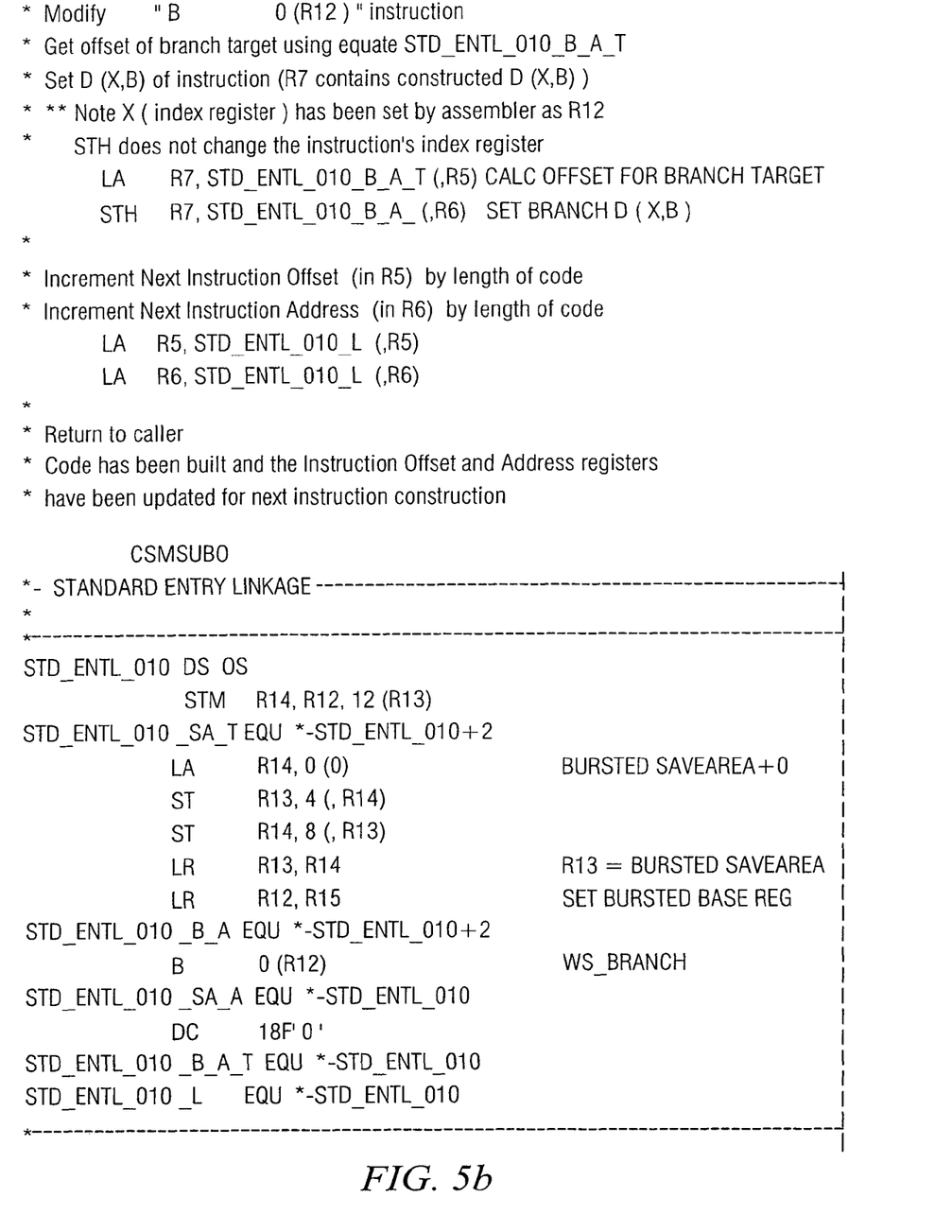
Figure 6A:
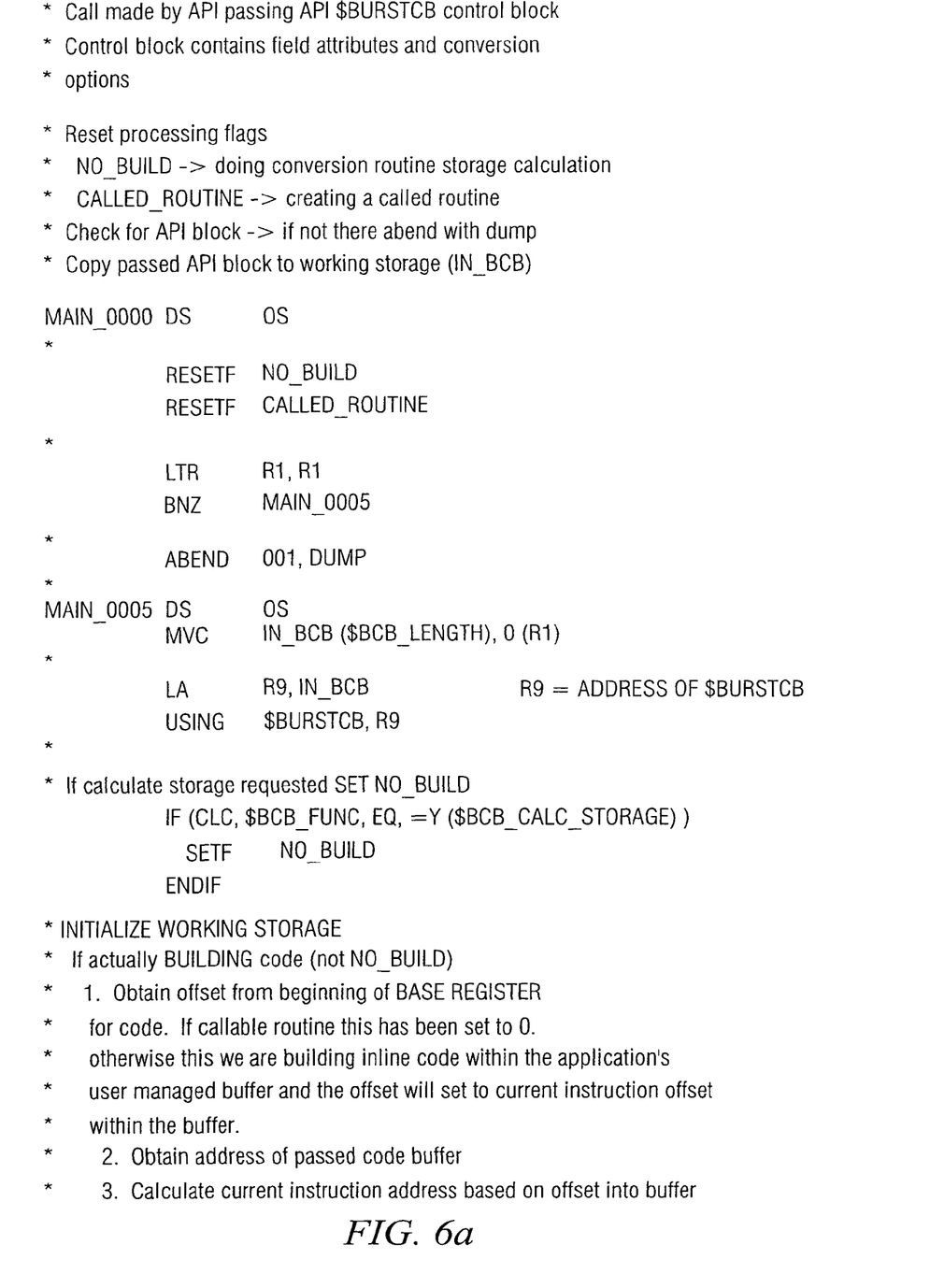
Figure 6B:
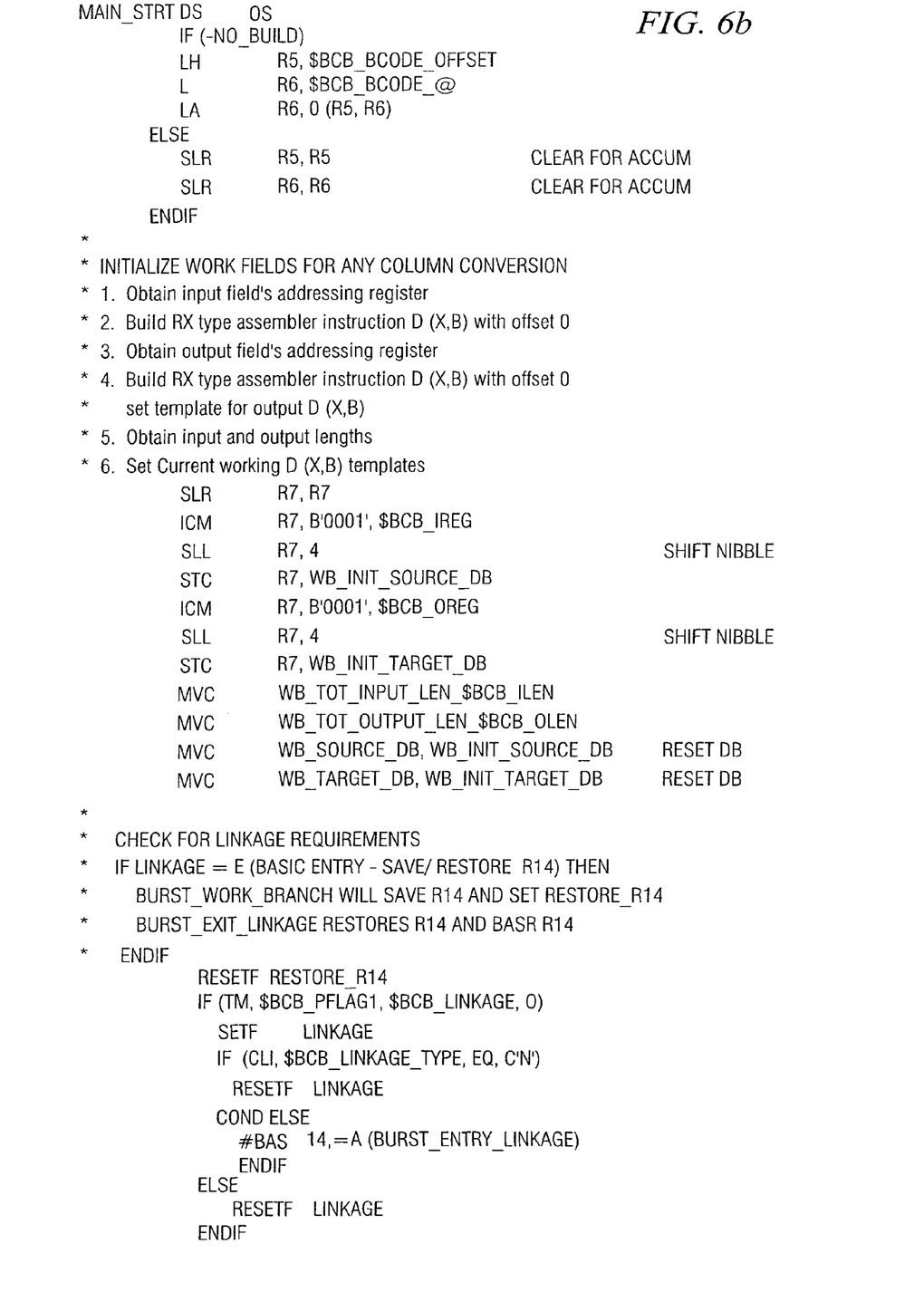
Figure 6E:
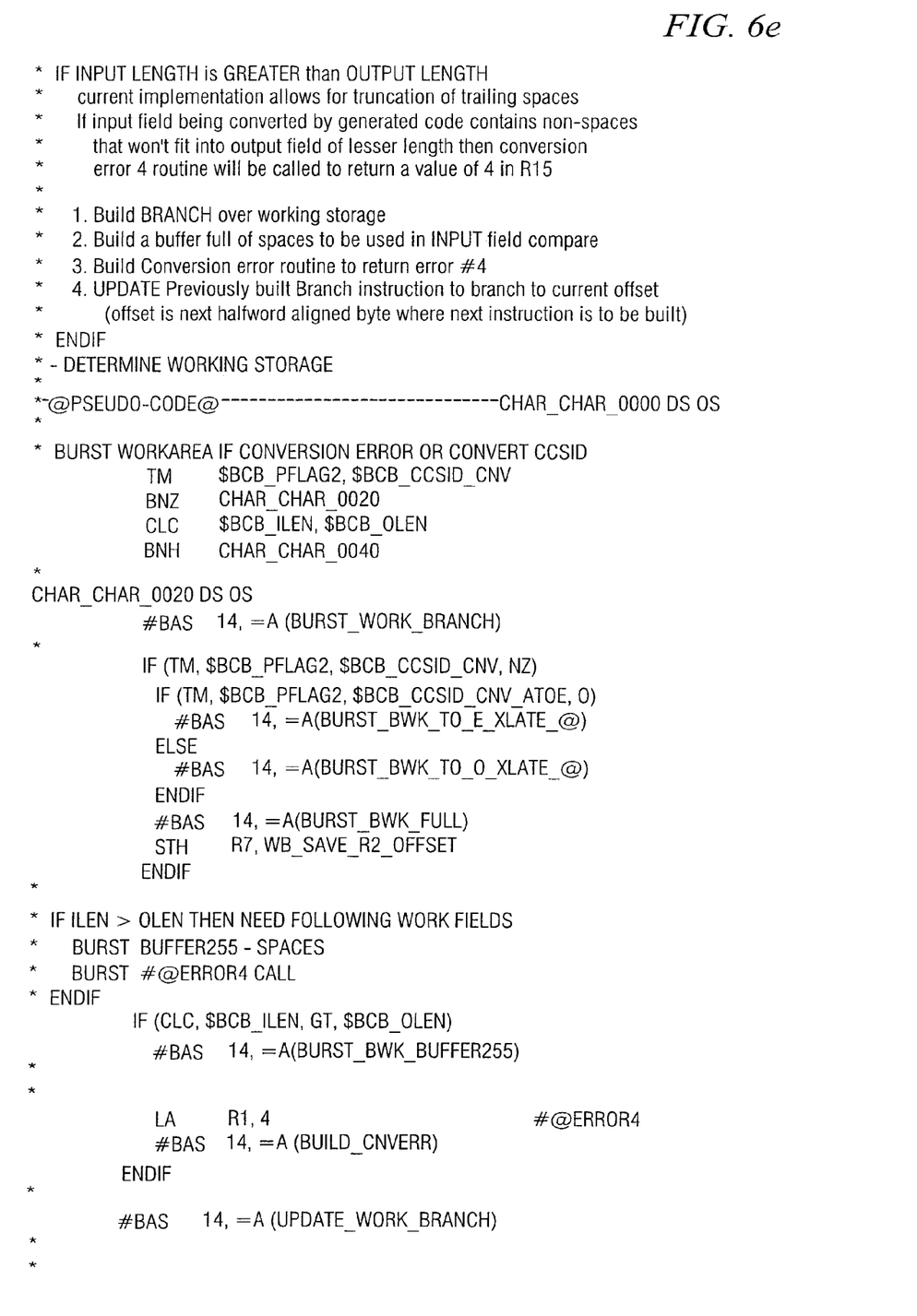
Figure 6G:
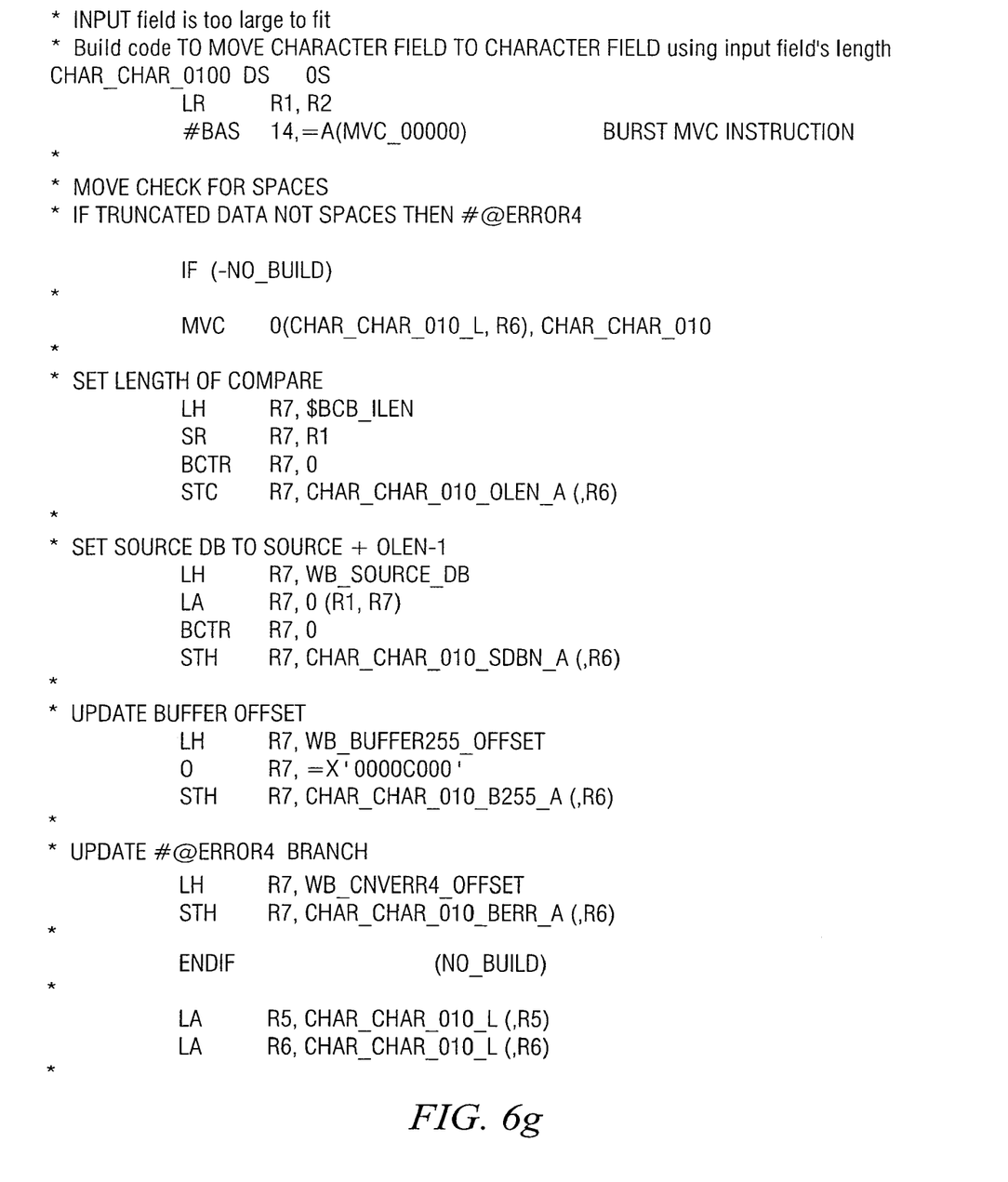
Figure 6H:
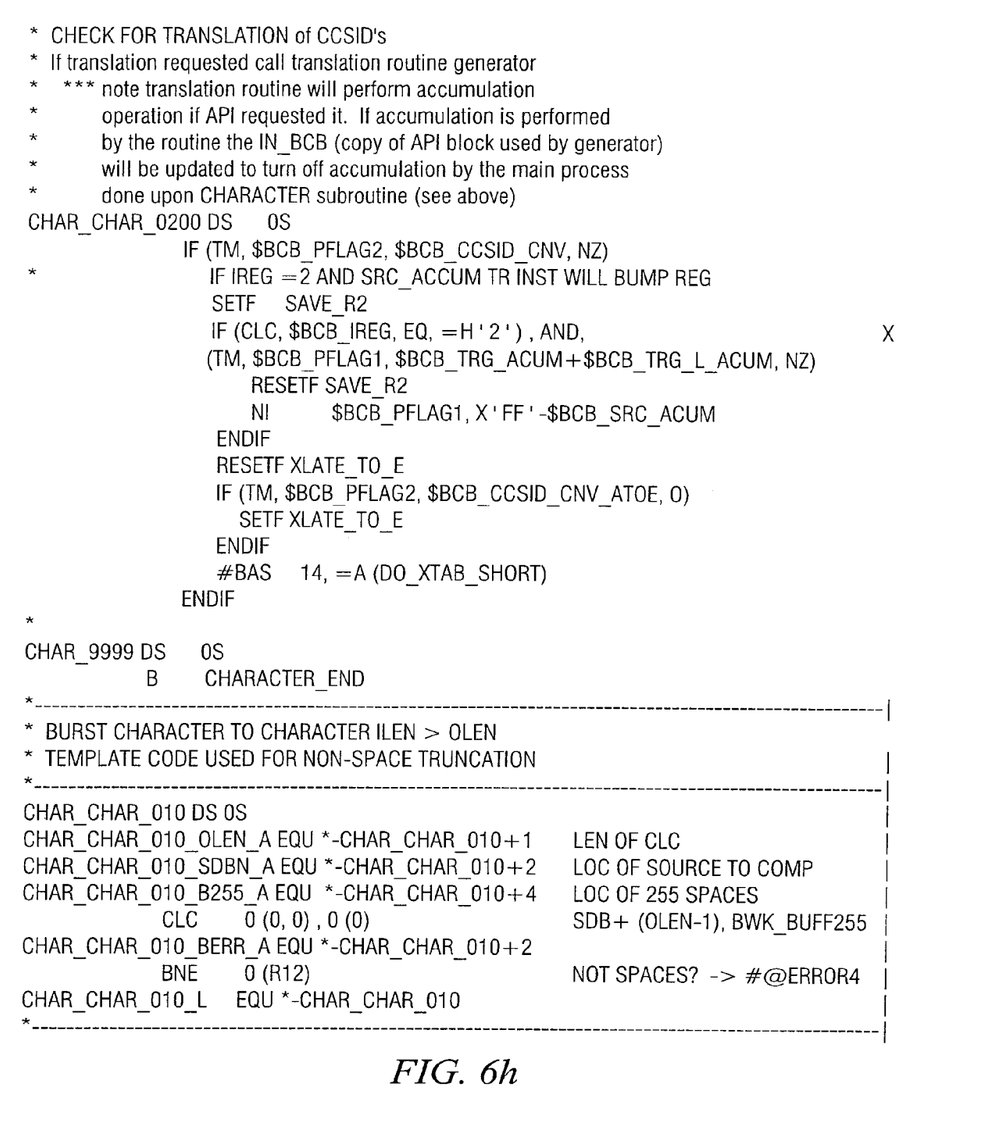

FIGS. 5a and 5b illustrate a general example of dynamic code building that is used in one embodiment of the present invention.

FIGS. 6a-6h illustrate a specific example of a dynamic code generation routine that performs CHARACTER to CHARACTER conversions.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of converting data of a plurality of input data types to a plurality of output data types by an application program, said method comprising:
   (a) receiving a first attribute of a first input data type and a second attribute of a first output data type;
   (b) dynamically creating, using at least one processor, at runtime a first optimized conversion routine based on said first attribute and said second attribute, the conversion routine including one or more computer instructions to be executed during conversion;
   (c) validating specific field conversion options of the conversion routine; and
   (d) executing said first optimized conversion routine from said application program to convert data of said first input data type to said first output data type.

2. The method of claim 1, wherein step (d) comprises calling said first optimized conversion routine from said application program.

3. The method of claim 1, wherein step (d) comprises storing said first optimized conversion routine inline with said application program.

4. The method of claim 1, wherein step (b) is performed dynamically while said application program is executing.

5. The method of claim 1, further comprising:
(e) receiving a third attribute of a second input data type and a fourth attribute of a second output data type;
(f) generating a second optimized conversion routine based on said third attribute and said fourth attribute; and
(g) executing said second optimized conversion routine from said application program to convert input data of said second input data type to said second output data type.

6. The method of claim 1, wherein said first and second attributes are character types.

7. The method of claim 1, further comprising generating program debugging instrumentation for said first optimized conversion routine.

8. The method of claim 1, wherein validating specific field conversion options of the conversion routine comprises verifying that input and output lengths are correct.

9. A method of converting data from input data types to output data types, said method comprising:
(a) receiving a plurality of sets of input attributes and output attributes from an application program, each set comprising one or more input attributes and one or more output attributes, the input attributes in a set being associated with a first data type and the output attributes in the set being associated with a second data type different than the first data type;
(b) dynamically creating, using at least one processor, at runtime a data conversion routine for each set of input attributes and output attributes, each conversion routine configured to convert data of the first data type of the associated set to the second data type of the associated set, each conversion routine including one or more computer instructions to be executed during conversion;
(c) validating specific field conversion options of the conversion routine; and
(d) storing each data conversion routine in memory accessible to said application program.

10. The method of claim 9, further comprising determining the size of the data conversion routine for each of the plurality of sets of input attributes and output attributes.

11. The method of claim 9, further comprising determining whether the data conversion routine for each of the plurality of sets of input attributes and output attributes should be callable by said application program or should be stored inline with said application program.

12. The method of claim 9, wherein step (b) is performed dynamically while said application program is executing.

13. The method of claim 9, wherein said input and output attributes are character type.

14. The method of claim 9, wherein said input and output attributes are date types.

15. The method of claim 9, further comprising generating program debugging instrumentation for each data conversion routine.

16. The method of claim 9, wherein validating specific field conversion options of the conversion routine comprises verifying that input and output lengths are correct.

17. A system for dynamically generating computer data conversion routines, said system comprising:
a processor; and
a memory device coupled to said processor;
wherein said system is adapted to receive a plurality of sets of input attributes and output attributes from an application program, each set comprising one or more input attributes and one or more output attributes, the input attributes in a set being associated with a first data type and the output attributes in the set being associated with a second data type different than the first data type; and
wherein said memory device stores instructions that, when executed by said processor, cause said processor to:
dynamically create at runtime a data conversion routine for each set of input attributes and output attributes, each conversion routine configured to convert data of the first data type of the associated set to the second data type of the associated set, each conversion routine including one or more computer instructions to be executed during conversion;
validate specific field conversion options of the conversion routines; and
store each data conversion routine in a memory device accessible to said application program.

18. The system of claim 17, wherein each data conversion routine is created while said application program is executing.

19. The system of claim 17, wherein said input attributes are character types and said output attributes are date types.

20. The system of claim 17, wherein said memory device stores further instructions that, when executed by said processor, cause said processor to generate program debugging instrumentation for each data conversion routine.

21. The system of claim 17, wherein said memory device stores further instructions that, when executed by said processor, cause said processor to determine the size of the data conversion routine for each of the plurality of sets of input attributes and output attributes.

22. The system of claim 17, wherein said memory device stores further instructions that, when executed by said processor, cause said processor to determine whether the data conversion routine for each of the plurality of sets of input attributes and output attributes should be callable by said application program or should be stored inline with said application program.

23. The system of claim 17, wherein validating specific field conversion options of the conversion routine comprises verifying that input and output lengths are correct.

24. Logic encoded in a non-transitory computer-readable medium, the logic operable when executed by a computer to:
(a) receive from an application program at least a first attribute associated with a first input data type and a second attribute associated with a first output data type;
(b) while the application program is executing, dynamically create a first conversion routine based on the first attribute and the second attribute, the first conversion routine configured to convert data of the first input data type to the first output data type, the first conversion routine including one or more computer instructions to be executed during conversion; and
(c) validate specific field conversion options of the conversion routine; and
(d) store the first data conversion routine in a memory device accessible to the application program.

25. The logic of claim 24, wherein the first data conversion routine is stored inline with the application program.

26. The logic of claim 24, further operable when executed to generate program debugging instrumentation for the first data conversion routine.

27. The logic of claim 24, wherein validating specific field conversion options of the conversion routine comprises verifying that input and output lengths are correct.

* * * * *